United States Patent
Bogacz

(10) Patent No.: US 12,487,361 B2
(45) Date of Patent: Dec. 2, 2025

(54) SYSTEMS AND METHODS FOR LiDAR-BASED CAMERA METERING, EXPOSURE ADJUSTMENT, AND IMAGE POSTPROCESSING

(71) Applicant: Illuscio, Inc., Culver City, CA (US)

(72) Inventor: Joseph Bogacz, Perth (CA)

(73) Assignee: Miris, Inc., Culver, CA (US)

( * ) Notice: Subject to any disclaimer, the term of this patent is extended or adjusted under 35 U.S.C. 154(b) by 45 days.

(21) Appl. No.: 18/193,145

(22) Filed: Mar. 30, 2023

(65) Prior Publication Data

US 2023/0400583 A1 Dec. 14, 2023

Related U.S. Application Data

(63) Continuation of application No. 17/836,621, filed on Jun. 9, 2022, now Pat. No. 11,630,211.

(51) Int. Cl.
G01S 17/89 (2020.01)
G01S 7/48 (2006.01)
G01S 7/4865 (2020.01)

(52) U.S. Cl.
CPC ............ *G01S 17/89* (2013.01); *G01S 7/4808* (2013.01); *G01S 7/4865* (2013.01)

(58) Field of Classification Search
CPC ....... G01S 17/89; G01S 7/4808; G01S 7/4865
See application file for complete search history.

(56) References Cited

U.S. PATENT DOCUMENTS

| | | | |
|---|---|---|---|
| 8,634,673 B1* | 1/2014 | McDougal | G06T 5/00 382/274 |
| 10,217,195 B1* | 2/2019 | Agrawal | G06T 7/11 |
| 2016/0377708 A1* | 12/2016 | Lou | G01S 17/894 348/221.1 |
| 2017/0289515 A1 | 10/2017 | Li et al. | |
| 2018/0349008 A1* | 12/2018 | Manzari | H04N 23/62 |
| 2020/0351434 A1* | 11/2020 | Wendel | H04N 23/72 |
| 2022/0207655 A1* | 6/2022 | Lin | H04N 23/80 |

* cited by examiner

*Primary Examiner* — Isam A Alsomiri
*Assistant Examiner* — Sanjida Naser
(74) *Attorney, Agent, or Firm* — Ansari Katiraei LLP; Arman Katiraei; Sadiq Ansari

(57) ABSTRACT

Disclosed is Light Detection and Ranging ("LiDAR")-based camera metering, exposure adjustment, and image postprocessing. The LiDAR-based exposure adjustment may include emitting a laser from an imaging device, obtaining one or more measurements based on the laser reflecting off one or more objects in a scene and returning to the imaging device, adjusting exposure settings of the imaging device based on the one or more measurements, and capturing an image of the scene using the exposure settings. The LiDAR-based image postprocessing may include receiving an image of a scene and measurements or outputs from a LiDAR scan of the scene, and performing different adjustments to color values, contrast, brightness, saturation, levels, and other visual characteristics of different sets of pixels in the image based on different distance, material property, and/or other measurements obtained by the LiDAR for objects represented by the different sets of pixels.

19 Claims, 10 Drawing Sheets

SYSTEMS AND METHODS FOR LiDAR-BASED CAMERA METERING, EXPOSURE ADJUSTMENT, AND IMAGE POSTPROCESSING

CLAIM OF BENEFIT TO RELATED APPLICATIONS

This application is a continuation of U.S. nonprovisional application Ser. No. 17/836,621 entitled "Systems and Methods for LiDAR-Based Camera Metering, Exposure Adjustment, and Image Postprocessing", filed Jun. 9, 2022. The contents of application Ser. No. 17/836,621 are hereby incorporated by reference.

BACKGROUND

Cameras may use a light metering sensor to measure the amount and/or intensity of light in a scene, and may adjust exposure settings of the camera based on the measurements before taking an image of the scene. The light metering sensor may be an instrument that is separate from the camera imaging sensor, or may be an adapted use of the camera imaging sensor.

While adjusting for light is instrumental to high quality imagery, other measurements besides light may be used to further improve image quality. The exposure settings and/or postprocessing that may be applied to a captured image may be refined using measurements besides light.

DETAILED DESCRIPTION OF PREFERRED EMBODIMENTS

The following detailed description refers to the accompanying drawings. The same reference numbers in different drawings may identify the same or similar elements.

Provided are systems and methods for Light Detection and Ranging ("LiDAR")-based camera metering, exposure adjustment, and image postprocessing. Specifically, depth, position, size, reflectivity, wetness (e.g., amount of moisture about the surface), roughness, translucence, and/or other measurements besides light may be obtained by a LiDAR sensor for objects in a scene, and may be used, in addition to or instead of light measurements, to adjust exposure settings prior to imaging the scene with a separate imaging sensor. For instance, an imaging device may incorporate the LiDAR measurements to automatically adjust the ISO, shutter speed, aperture, depth-of-field, and/or other imaging settings of an imaging device to improve the image quality and capture of complex scenes that may include varying lighting, objects at different distances, objects with different material properties, and/or other variations. Additionally, the systems and methods may include dynamically and independently editing and/or adjusting the visualization for different objects that are captured in an image during postprocessing based on the LiDAR measurements. For instance, the color values and/or other visual characteristics for different pixels that represent different objects in an image may be adjusted differently based on the depth, position, size, reflectivity, wetness, roughness, translucence, and/or other measurements obtained for those objects by the LiDAR sensor.

Figure 1:
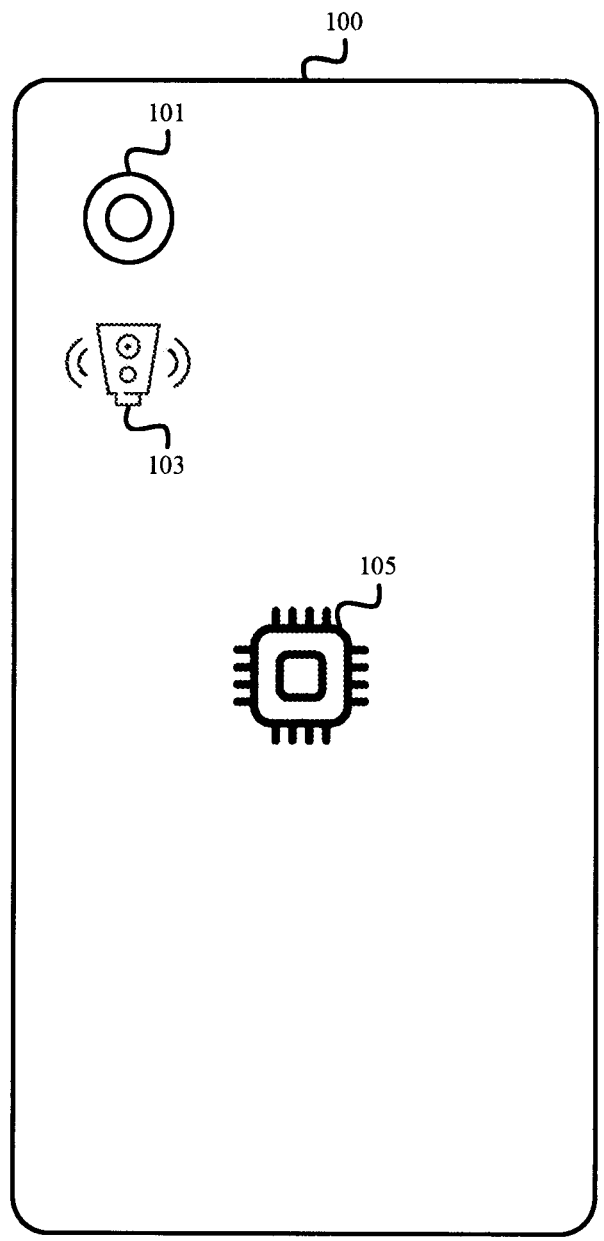
FIG. 1 illustrates an example of incorporating a Light Detection and Ranging ("LiDAR") sensor to an imaging device in accordance with some embodiments.

FIG. 1 illustrates an example of incorporating a LiDAR sensor to an imaging device in accordance with some embodiments. As shown in FIG. 1, imaging device 100 may include one or more imaging sensors 101 and LiDAR sensor 103. In some embodiments, imaging device 100 may correspond to a camera, smartphone, and/or another device.

Imaging sensors 101 may perform image capture by converting light that reaches different parts of the sensor to electrical signals. Imaging sensors 101 may include a complementary metal oxide semiconductor ("CMOS"), charge-coupled device ("CCD"), and/or other integrated circuit with a set of photodiodes for measuring the color components of light reaching different parts of the sensor. Imaging sensors 101 may include one or more sensors adapted with different lens such as a telephoto, wide, ultra-wide, macro, and/or other lens. Imaging sensors 101 may operate with configurable exposure settings. The exposure settings may control the amount of light that imaging sensors 101 are exposed to during an image capture, the depth-of-field, and/or how imaging sensors 101 capture an image. The configurable exposure settings may adjust the shutter speed, aperture, ISO, and/or other parameters of imaging sensors 101 that control the amount of light, the type of light, and how the received light is processed by imaging sensors 101.

LiDAR sensor 103 may include a laser transceiver that emits a series of laser beams at different angles or directions, and that measures the return of each laser beam. The intensity or return strength of a laser beam may vary based on the traveled distance or range, incident angle (e.g., angle of arrival), surface composition, and/or other material properties of the object that reflects the emitted laser beam. LiDAR sensor 103 may convert the return measurements to measurements of depth, position, size, density, reflectivity, wetness, roughness, translucence, and/or other material properties of the object that reflects the emitted laser beam. Additional, time-of-flight ("ToF") measurements may determine the distance of an object to LiDAR sensor 103.

In some embodiments, LiDAR sensor 103 may continuously obtain and/or update the measurements while imaging device 100 is active. In some other embodiments, LiDAR sensor 103 may obtain the measurements in response to input that activates imaging sensors 101 and/or the imaging or capture of a scene. LiDAR sensor 103 may provide the measurements to imaging sensors 101 and/or processor 105 that sets the configurable settings and controls the activation of imaging sensors 101.

Imaging sensors 101 and/or processor 105 may adjust the exposure settings prior to image capture based on the measurements or outputs from LiDAR sensor 103. In some embodiments, imaging sensors 101 and/or processor 105 may also receive light measurements from a different sensor or light meter, and may incorporate the light measurements when adjusting the exposure settings. In some such embodiments, the light measurements may be taken by an adapted use of imaging sensors 101.

In some embodiments, the measurements or outputs from LiDAR sensor 103 may be used to adjust the focal length of imaging sensors 101 based on the distance and/or position of an object being imaged. In other words, the autofocus of imaging device 100 may be controlled partially or entirely based on the outputs of LiDAR sensor 103.

Figure 2:
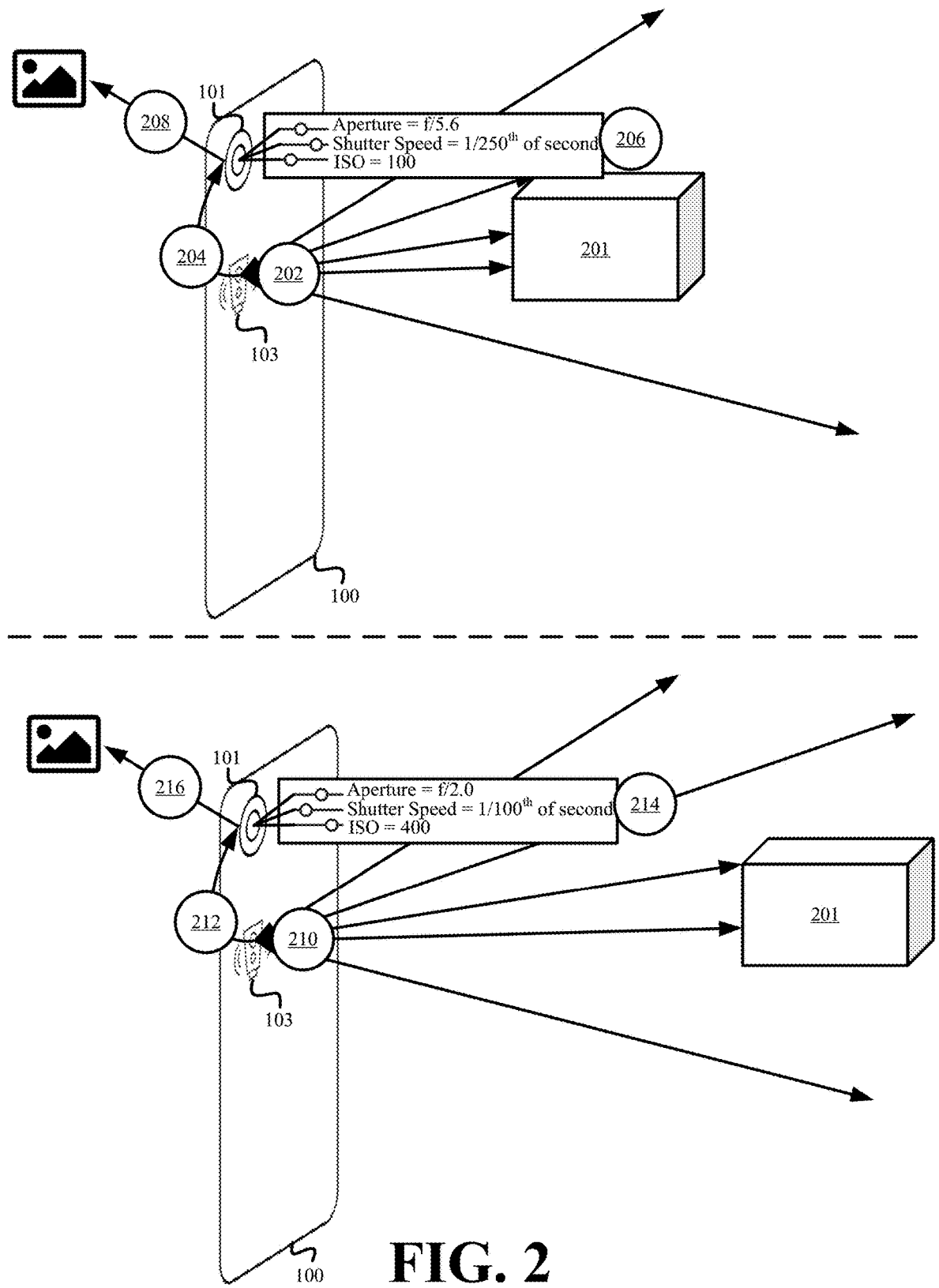
FIG. 2 illustrates an example of adjusting exposure settings based on a distance measurement obtained from the LiDAR sensor in accordance with some embodiments presented herein.

FIG. 2 illustrates an example of adjusting exposure settings of imaging sensors 101 based on a distance measurement obtained from LiDAR sensor 103 in accordance with some embodiments presented herein. As shown in FIG. 2, imaging device 100 may be used to capture a first image of object 201 at a first distance from imaging device 100, and a second image of object 201 at a farther second distance from imaging device 100.

Prior to capturing the first image, LiDAR sensor 103 may measure (at 202) the first distance to object 201, and may provide (at 204) the first distance measurement as a first input to imaging sensors 101 and/or processor 105. An additional second input may be a light measurement that is directly obtained from imaging sensors 101, or that is indirectly obtained from a light sensor (e.g., a light meter) that is separate from imaging sensors 101 and/or LiDAR sensor 103.

Based on the first distance measurement obtained from LiDAR sensor 103 and/or a particular light measurement, imaging sensors 101 and/or processor 105 may compute and/or select a first set of exposure settings with which to optimally image the particular object at the first distance. The first set of exposures settings may include a first set of shutter speed, aperture, and ISO values for imaging sensors 101. Imaging sensors 101 may be configured (at 206) with the first set of exposure settings, and may generate (at 208) the first image of object 201 at the first distance based on light that reaches imaging sensors 101 when operating imaging sensors 101 with the first set of exposure settings.

Prior to capturing the second image, LiDAR sensor 103 may measure (at 210) the second distance to the particular object, and may provide (at 212) the second distance measurement as an input to configure the exposure settings for imaging sensors 101. The scene lighting may remain the same between taking the first image and taking the second image. Accordingly, the particular light measurement may also be provided as additional input for configuring the exposure settings for imaging sensors 101.

Based on the second distance measurement obtained from LiDAR sensor 103 and the same particular light measurement, imaging device 100 may compute and/or select a different second set of exposure settings with which to optimally image the particular object at the second distance. As shown in FIG. 2, imaging sensor 101 may be configured (at 214) with a different second set of shutter speed, aperture, and ISO settings, and may generate (at 216) the second image of object 201 at the second distance based on light that reaches imaging sensors 101 when operating imaging sensors 101 with the second set of exposure settings. In some embodiments, imaging device 100 may be configured with a table that maps light and distance measurements to an optimal set of exposure settings. In some such embodiments, the optimal set of exposure settings may be modified based on a portrait, landscape, sport, and/or image mode that a user selects or that is automatically selected for the scene by imaging device 100.

Even though the scene lighting did not change between taking the first and second images, imaging device 100 may lengthen the exposure (e.g., slower shutter speed, larger aperture, slower ISO, etc.) when capturing object 201 at the farther second distance than at the closer first distance. In some embodiments, the longer exposure may be used to increase the color contrast and brightness of object 201 at the farther second distance so that more or finer detail may be captured in the second image. In some embodiments, the longer exposure may be used to balance the color contrast and brightness of object 201 at the farther second distance so that the color contrast and brightness more closely matches imaging of object 201 from the closer first distance. For instance, more reflected light from object 201 may reach imaging sensors 101 the closer object 201 is to imaging sensors 101. Accordingly, increasing the exposure for object 201 at the second distance may be used to balance the total amount of reflected light that reaches imaging sensors 101 for the more distant object.

Lengthening the exposure based on the distance measurements obtained from LiDAR sensor 103 may also improve night-mode photography or images that are taken in low light conditions. For instance, an object that is photographed in low light and is closer to imaging device 100 may be larger and therefore easier to discern in a darker setting with less color contrast. Moreover, because of the proximity of the object to imaging device 100, more light may reflect off the object and may reach imaging sensors 101. However, the same object being photographed in low light and farther from imaging device 100 may be smaller and therefore more difficult to discern in the darker setting with less color contrast. Additionally, less light may reflect off the object and reach imaging sensors 101. Accordingly, imaging device 100 may use the distance measurements from LiDAR sensor 103 to configure imaging sensors 101 with a first set of exposure settings that increase exposure when low-light conditions are detected and an object detected by LiDAR sensor 103 is a first distance away, and may configure imaging sensors 101 with a second set of exposure settings that decrease exposure when low-light conditions are detected and the object detected by LiDAR sensor 103 is a closer second distance away that is less than the first distance.

When a scene contains multiple objects at different positions and/or distances, imaging device 100 may select the optimal exposure settings based on the light measurements and distance measurements for the one or more in-focus or focused on objects in the scene. In some embodiments, imaging device 100 may obtain the median distance for the objects in the scene or the distance containing the most objects, and may select the optimal exposure settings based on the light measurements and the selected distance for the scene containing multiple objects.

LiDAR sensor 103 may also detect various material properties of an object, and these material properties may also be used to adjust exposure settings and/or other settings of imaging sensors 101 in order to improve image quality. The material properties may be values that are derived from the actual measurements that are obtained from LiDAR sensor 103. For instance, the laser beam return strength, incident angle, and/or other measurements may be converted into a measure of an object's reflectivity, amount of moisture about the object's surface (e.g., wetness), roughness, translucence, and/or other derived material properties of the object.

Figure 3:
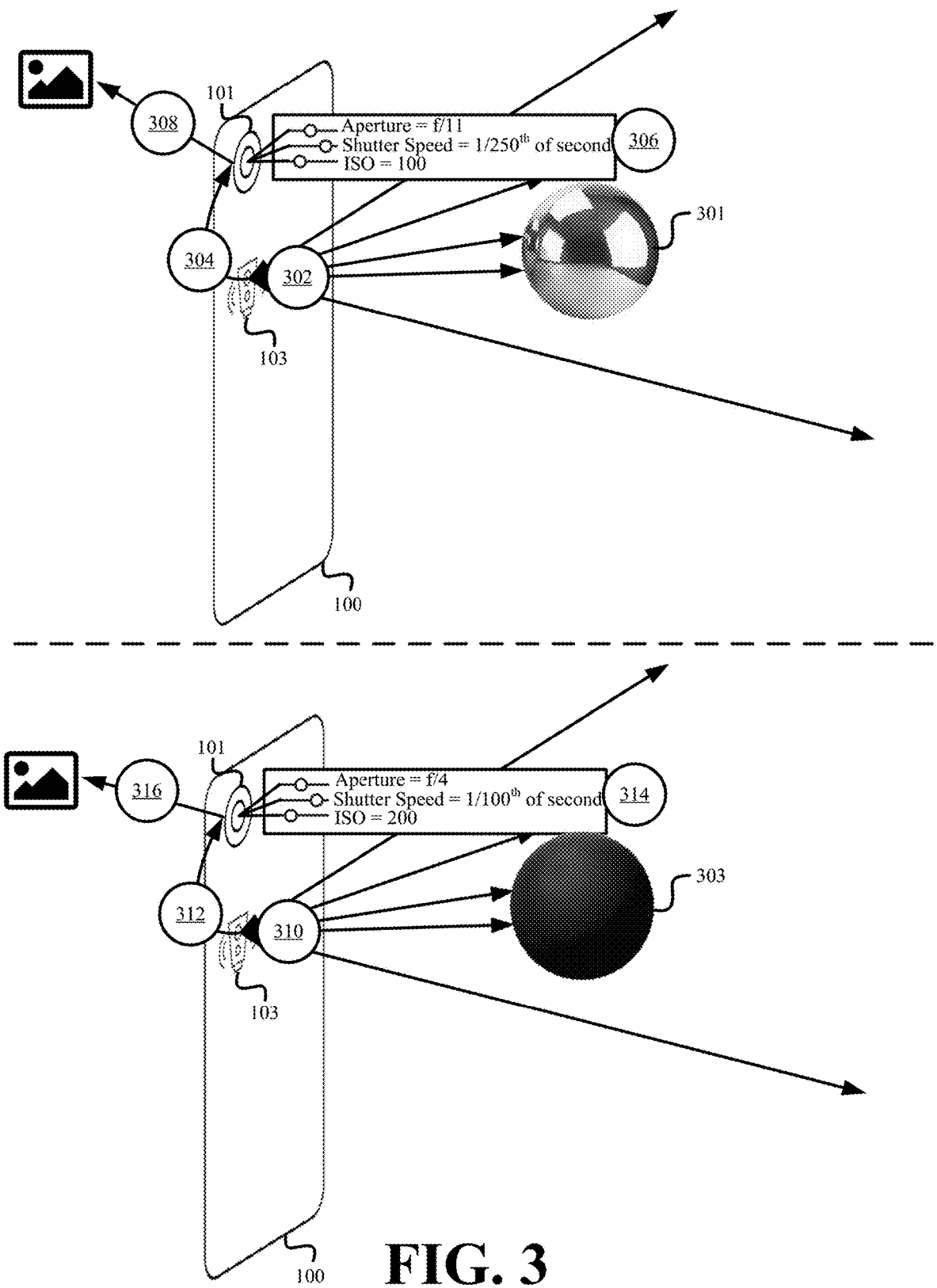
FIG. 3 illustrates an example of adjusting exposure settings based on a reflectivity measurement obtained from the LiDAR sensor in accordance with some embodiments presented herein.

FIG. 3 illustrates an example of adjusting exposure settings of imaging sensors 101 based on a reflectivity measurement obtained from LiDAR sensor 103 in accordance with some embodiments presented herein. As shown in FIG. 3, imaging device 100 may be used to capture a first image of reflective first object 301 (e.g., a metallic object) at a particular distance from imaging device 100, and a second image of matte second object 303 (e.g., a wooden or plastic object) at the same particular distance from imaging device 100.

Prior to capturing the first image of reflective first object 301, LiDAR sensor 103 may measure (at 302) the reflectance or reflective properties of reflective first object 301. Specifically, a greater intensity or return strength of the laser beam emitted from LiDAR sensor 103 may be indicative of a more reflective surface, and a lower intensity or return strength of the laser beam emitted from LiDAR sensor 103 may be indicative of a more matte or less reflective surface. LiDAR sensor 103 may provide (at 304) the first reflectance measurement as an input to configure the exposure settings for imaging sensors 101.

Based on the first reflectance measurement, imaging device 100 may compute and/or select a first set of exposure settings with which to optimally capture the reflectivity of reflective first object 301. For instance, a first set of shutter speed, aperture, and ISO values resulting in a longer exposure may be used to emphasize the reflective highlights and/or capture reflective first object 301 with greater reflectivity. In other words, the longer exposure may enhance or boost the shininess and/or amount of light that reflects of the surfaces of reflective first object 301. Accordingly, imaging sensors 101 may be configured (at 306) with the first set of exposure settings based on the first reflectance measurement, and may generate (at 308) the first image of reflective first object 301 that optimally captures the highlights and/or reflectivity of reflective first object 301.

In some embodiments, imaging device 100 may be configured with a mapping that specifies optimal exposure settings for different material properties (e.g., very reflective, slightly reflective, matte, opaque, etc.). In some other embodiments, imaging device 100 may continually adjust the exposure settings for a real-time and/or continuous image being captured by imaging sensors 101, may compare the image resulting from each adjusted exposure setting to image quality criteria, and may select the optimal exposure settings for the scene based on the comparisons and the material properties output by LiDAR sensor 103.

Prior to capturing the second image of matte second object 303, LiDAR sensor 103 may measure (at 310) the reflectance or reflective properties of matte second object 303. LiDAR sensor 103 may obtain lower intensity values when measuring the matte second object 303 than when measuring the reflective first object 301. LiDAR sensor 103 may provide (at 312) the second reflectance measurement as an input to configure the exposure settings for imaging sensors 101.

Based on the lower second reflectance measurement, imaging device 100 may compute and/or select a different second set of exposure settings with which to optimally capture the matte surfaces of second object 303. For instance, imaging sensors 101 may be configured (at 314) with a second set of shutter speed, aperture, and ISO values that result in a shorter exposure and that better capture and/or represent the non-glossy and/or muted surfaces of matte second object 303. In other words, capturing matte second object 303 with less light than reflective first object 301 will make matte second object 303 appear less shiny and glossy than reflective first object 301 irrespective of the differences in the object material properties. Imaging sensors 101 may generate (at 316) the second image of matte second object 303 that optimally capture the lowlights and/or matte surfaces of matte second object 303. Accordingly, the first set of exposure settings used to capture the first image of reflective first object 301 and the second set of exposure settings used to capture the second image of matte second object 303 may visually emphasize the different material properties (e.g., reflective versus matte) of the two objects detected by LiDAR sensor 103, and/or to visually differentiate the images of the two objects.

When a scene contains multiple objects with different material properties, imaging device 100 may select the optimal exposure settings based on the light measurements and material properties for the one or more in-focus or focused on objects in the scene. In some embodiments, imaging device 100 may identify the most common material property across the scene with multiple objects, and may select the optimal exposure settings based on the light measurements and the most common material property.

Figure 4:
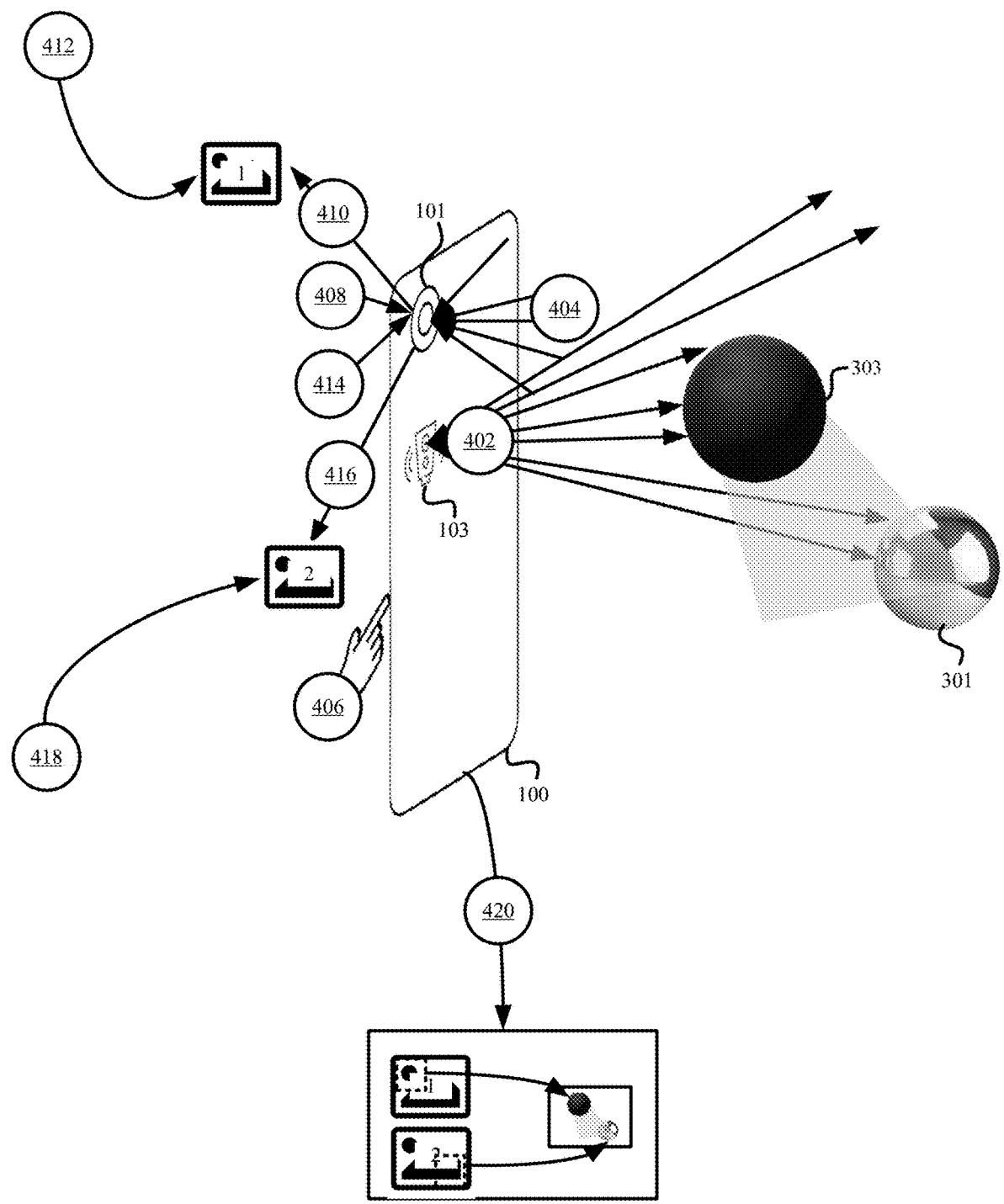
FIG. 4 illustrates an example of performing bracketed imaging of a scene based on measurements obtained from the LiDAR sensor in accordance with some embodiments presented herein.

In some embodiments, LiDAR sensor 103 may be used to create customized high dynamic range ("HDR") images based on exposure settings for bracketed imaging that are dynamically selected based on the measurements from LiDAR sensor 103. FIG. 4 illustrates an example of performing bracketed imaging of a scene based on measurements obtained from LiDAR sensor 103 in accordance with some embodiments presented herein.

The scene to be imaged may include objects 301 and 303 at different distances from imaging device 100 and with different material properties that modify their respective interactions with light. Specifically, matte second object 303 may be positioned partially over or in front of reflective first object 301 such that the shadow of matte second object 303 is partially over part of reflective first object 301.

Imaging device 100 may use LiDAR sensor 103 to determine (at 402) the distance and material properties of each object 301 and 303 in the scene. For instance, LiDAR sensor 103 may return different ToF values, incident angles, and/or intensity values (e.g., strength of the received laser beam that reflects of each object 301 and 303 and returns to LiDAR sensor 103) for each object 301 and 303. LiDAR sensor 103 and/or processor 105 of imaging device 100 may convert these values and/or other output from LiDAR sensor 103 into distance measurements and material properties (e.g., reflectivity, wetness, roughness, translucence, etc.) of each object.

Additionally, imaging device 100 may use imaging sensors 101 and/or a light meter to measure (at 404) the lighting of the scene. Specifically, readings from different parts of imaging sensors 101 may be used to determine the amount of light at different regions of the scene.

Rather than perform traditional HDR photography in which multiple images of the scene are taken at different predefined exposure levels, imaging device 100 may dynamically set the exposure levels with which to image each object 301 and 303 based on the distance measurements, material properties, and/or other outputs obtained for each object 301 and 303 by LiDAR sensor 103. For instance, traditional HDR photography may involve setting predefined exposure levels based on the lighting of scene and irrespective of the distance and material properties of the object in the scene. Specifically, the predefined exposure levels may include configuring the camera to take three images at different shutter speeds that overexposure, underexpose, and obtain a regular exposure for all objects in the scene.

Dynamically setting the exposure levels for the custom HDR photography performed by imaging device 100 may include detecting the number of objects in the scene, determining the distance and material properties of each object using LiDAR sensor 103, and configuring bracketed photography to take a different image for each object with the exposure settings of each image being dynamically configured according to the distance and material properties of a different object in response to a single activation of imaging device 100. Accordingly, if LiDAR sensor 103 detects four objects at different distances and/or with different material properties, imaging device 100 may dynamically configure imaging sensors 101 to rapidly take four different images with the exposure level for each image being changed to optimally capture a different object within the scene based on the distance, material properties, and/or other output obtained for that object by LiDAR sensor 103.

Imaging device 100 may receive (at 406) an input that activates the custom HDR photography function of imaging device 100 and takes the bracketed images with exposure settings that are dynamically defined based on the LiDAR outputs for each detected object in the scene. In response to the input, imaging device 100 may determine that matte object 303 is a first distance from imaging device 100 and has a non-reflective material property based on LiDAR sensor 103 output, and that matte object 303 is in a region receiving a first amount of light. Imaging device 100 may define (at 408) a first set of exposure settings for optimally imaging matte object 303 based on its distance, material properties, lighting, and/or other sensor inputs, and may generate (at 410) a first image of the entire scene using the first set of exposure settings. Imaging device 100 may tag (at 412) the first image with the first set of exposure settings that were used to capture that image. In some embodiments, tagging (at 412) the first image may include associating metadata or an identifier to each of the pixels representing matte object 303 that is optimally captured using the first set of exposure settings. In other words, the first image may be tagged with metadata for the exposure settings that were used to capture that image as well the set of pixels for the particular object (e.g., matte object 303) that the first set of exposure settings were defined against. In some embodiments, LiDAR sensor 103 may obtain positional data (e.g., x, y, and z spatial coordinates) for the various measurements and/or material properties detected in the scene, and may map those measurements and/or material properties to different pixels in an image captured by imaging sensors 101 or to different photodiodes across imaging sensors 101 based on the positional data. Moreover, in response to the input, imaging device 100 may determine that reflective object 301 is a second distance from imaging device 100 and has a reflective material property based on LiDAR sensor 103 output, and that reflective object 301 is in a region receiving a different second amount of light. Imaging device 100 may define (at 414) a second set of exposure settings for optimally imaging reflective object 301 based on its distance, material properties, lighting, and/or other sensor inputs, and may generate (at 416) a second image of the entire scene using the second set of exposure settings. Imaging device 100 may tag (at 418) the second image with the second set of exposure settings that were used to capture that image, and/or may associate metadata or an identifier to each of the pixels representing reflective object 301 that is optimally captured using the second set of exposure settings.

Imaging device 100 or postprocessing software may combine the first and second images, and may produce (at 420) a single composite image that combines the optimal image data for each object 301 and 303 in the single composite image. Producing (at 420) the single composite image may include extracting the first set of pixels from the first image that represent matte object 303 as captured with the first set of exposure settings, extracting the second set of pixels from the second image that represent reflective object 301 as captured with the second set of exposure settings, and combining the first set of pixels with the second set of pixels in the single composite image. Accordingly, the single composite image may present matte object 303 as imaged with the first set of exposure settings, and reflective object 301 as imaged with the second set of exposure settings. Stated differently, the single composite image may optimally capture the lowlights of matte object 303 and the highlights of reflective object 301 in one image.

Figure 5:
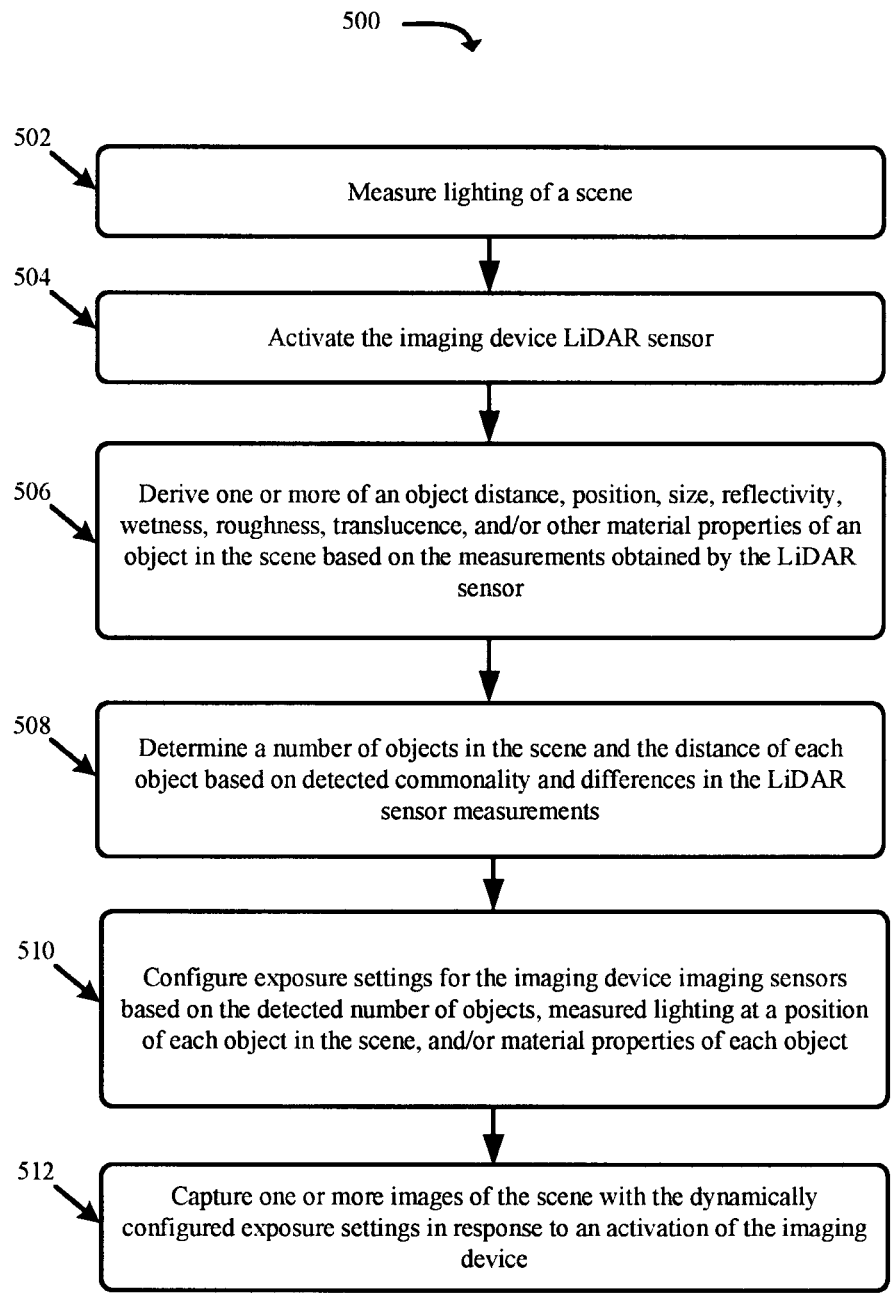
FIG. 5 presents a process for LiDAR-based camera metering and exposure adjustment in accordance with some embodiments presented herein.

FIG. 5 presents a process 500 for LiDAR-based camera metering and exposure adjustment in accordance with some embodiments presented herein. Process 500 may be implemented by one or more processors of imaging device 100 (e.g., processor 105) based on measurements and/or other output obtained from LiDAR sensor 103.

Process 500 may include measuring (at 502) lighting of a scene. Imaging device 100 may obtain the light measurements from imaging sensors 101 and/or another light meter that is connected to imaging device 100.

Process 500 may include activating (at 504) LiDAR sensor 103. Activating (at 504) LiDAR sensor 103 may include emitting lasers from LiDAR sensor 103 to different points across the scene, and measuring the return strength, ToF, incident angle, and/or other properties of each laser after it reflects off one or more surfaces in the scene and returns to LiDAR sensor 103.

Process 500 may include deriving (at 506) one or more of an object distance, position, size, reflectivity, wetness, roughness, translucence, and/or other material properties of an object in the scene based on the measurements obtained by LiDAR sensor 103. Process 500 may also include determining (at 508) a number of objects in the scene and the distance of each object based on detected commonality and differences in the LiDAR sensor 103 measurements. For instance, a single object may be detected in response to a common set of ToF values and derived reflectivity values, and two objects may be detected in response to a first set of ToF values with a first set of material properties, and a second set of ToF values with a second set of material properties.

Process 500 may include dynamically configuring (at 510) exposure settings for imaging sensors 101 based on the detected number of objects, measured lighting at a position of each object in the scene, and/or material properties of each object. In some embodiments, dynamically configuring (at 510) the exposure settings may include setting the aperture, shutter speed, ISO, focal length, and/or other imaging properties of imaging sensors 101 based on the aggregate measurements and/or derived values. In some embodiments, dynamically configuring (at 510) the exposure settings may include automatically defining bracketed photography for taking a different image of each detected object in the scene with a custom set of exposure settings that are optimally configured based on the distance and/or material properties of that object as detected by LiDAR sensor 103. For instance, LiDAR sensor 103 may detect three distinct object in the scene with different material properties, and dynamically configuring (at 510) the exposure settings may include configuring a first set of exposure settings based on first material properties of a first object for a first image of the scene that optimally captures the first object, changing to a second set of exposure settings based on second material properties of a second object for a second image of the scene that optimally captures the second object, and changing to a third set of exposure settings based on third material properties of a third object for a third image of the scene that optimally captures the third object.

Process 500 may include capturing (at 512) one or more images of the scene with the dynamically configured (at 510) exposure settings in response to an activation of imaging device 100. For instance, a user may press on a graphical or physical shutter button to cause imaging device 100 to generate one or more images based on the light reaching the different photodiodes of imaging sensor 101, and a conversion of that light at each photodiode into color values (e.g., RGB) for pixels of an digital image. In some embodiments, imaging device 100 may continuously perform the light measurements and LiDAR sensor 103 measurements while imaging device 100 is on and/or operational and before the press of the graphical or physical shutter button. In some other embodiments, imaging device 100 may perform operations 502-508 in response to the activation of the graphical or physical shutter button.

In some embodiments, the measurements and/or derived outputs from the measurements of LiDAR sensor 103 may be used to enhance or improve image quality during image postprocessing. In some such embodiments, output from LiDAR sensor 103 may be used to interpret how the captured light and color values are to be processed in order to generate an image, or may be used to adjust the color values and/or other visual characteristics of the image pixels after the image is generated from the data captured by imaging sensors 101. For instance, the distance measurements and material properties detected for different objects in a scene may be used to perform separate adjustments to the RGB values and/or other visual characteristics of the objects during postprocessing of the image that is generated for that scene.

Figure 6:
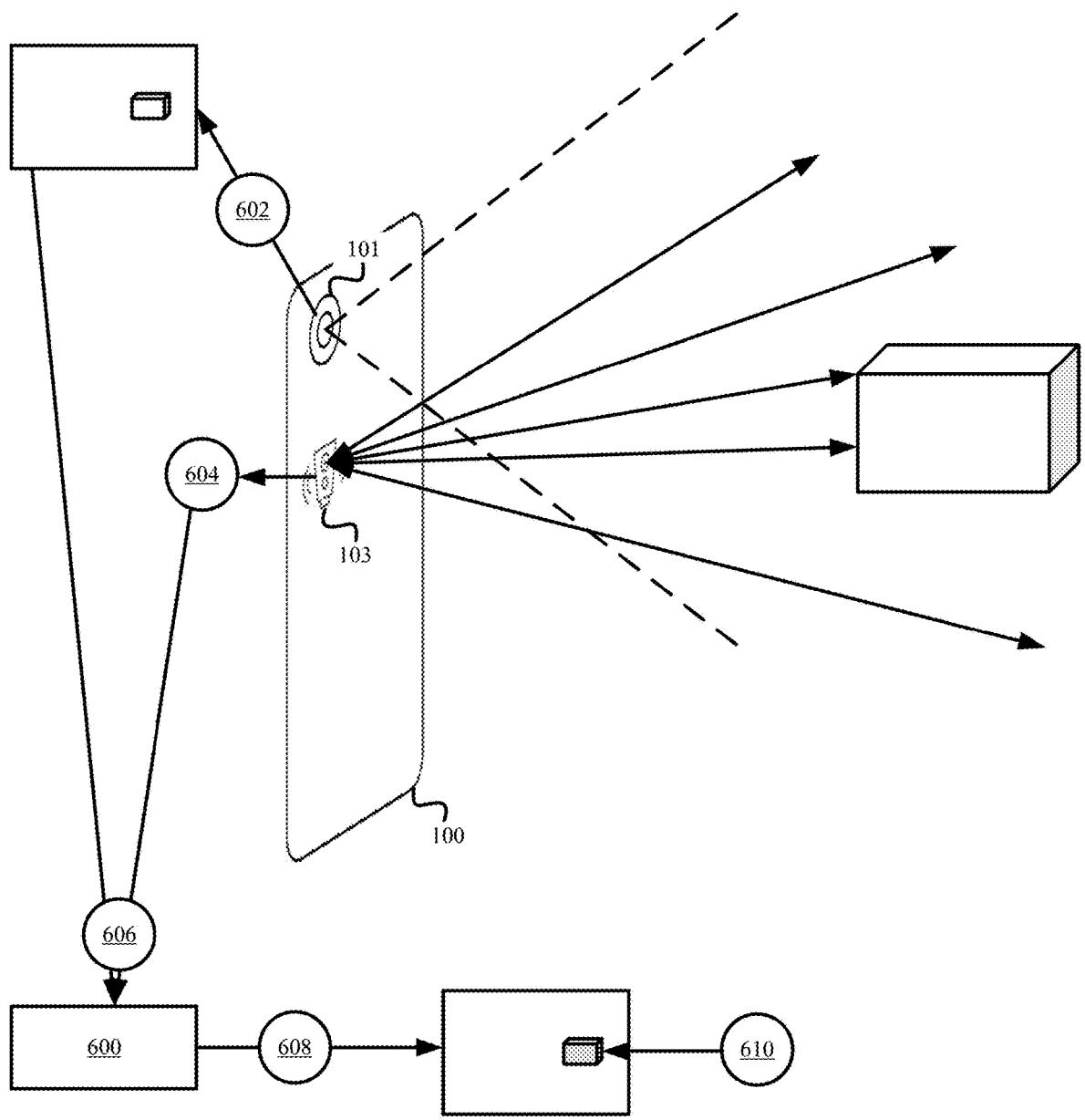
FIG. 6 illustrates an example of postprocessing an image based on distance measurements obtained from the LiDAR sensor in accordance with some embodiments presented herein.

FIG. 6 illustrates an example of postprocessing an image based on distance measurements obtained from LiDAR sensor 103 in accordance with some embodiments presented herein. Imaging device 100 may capture (at 602) an image of a scene based on output of imaging sensor 101 configured with a set of exposure settings. In some embodiments, the set of exposure settings may be defined based on outputs from LiDAR sensor 103, may be manually set by a user, and/or may be automatically set without the outputs from LiDAR sensor 103.

LiDAR sensor 103 may be activated before, during, or immediately after the image capture. In response to the activation of LiDAR sensor 103, LiDAR sensor 103 may measure (at 604) the distance of the one or more imaged objects in the scene.

Imaging device 100 may provide (at 606) the image data (e.g., RGB values for each pixel of the captured image) along with LiDAR sensor 103 measurements for postprocessing. In some embodiments, providing (at 606) the image data with LiDAR sensor 103 measurements may include associating the measurements to regions or pixels within the image. For instance, LiDAR sensor 103 may obtain positional data (e.g., x, y, and z spatial coordinates) for each distance measurement, detected material property, and/or other output obtained by LiDAR sensor 103, and may associate those measurements, material properties, and/or outputs to different pixels of the image by mapping the positional data to the positions of the image pixels.

The postprocessing may be performed by the one or more processors of imaging device 100 prior to presenting the image on a display, or may be performed by one or more processors of postprocessing system 600 that receives the captured images from imaging device 100 and performs subsequent processing or editing of the images. The postprocessing may analyze (at 608) the outputs from LiDAR sensor 103 for object depth, position, and/or distance relative to the amount of light in the scene, and may dynamically adjust (at 610) the RGB values for the object based on the determined object depth, position, and/or distance.

For instance, if the imaged object is a particular distance that is determined to be far away from imaging device 100 and/or the object is determined to be small based on a number of pixels or return laser measurements representing that object, the postprocessing may include boosting the RGB values and/or increasing the color contrast or other visual characteristics of the object relative to surrounding pixels so that the distant object becomes more noticeable in the image. Similarly, if the object is determined to be far away from imaging device 100 and the lighting is below a threshold amount, the postprocessing may include boosting the RGB values and/or increasing the color contrast of the object so that it is less likely to blend with the background and is better differentiated from other objects in the background. In this manner, the postprocessing may use the outputs from LiDAR sensor 103 to enhance and/or improve low-light photography without requiring more expensive imaging sensors 101 that let in and/or capture more light using smaller apertures.

In some embodiments, the postprocessing may generate an opposite effect. Specifically, the postprocessing may include boosting the RGB values and/or increasing the color contrast, brightness, and/or other visual characteristics of the foreground objects or the objects that are determined to be a closer first distance from imaging device 100 based on measurements obtained from LiDAR sensor 103, and leaving unchanged or decreasing the RGB values, color contrast, and/or other visual characteristics of the background objects or the objects that are determined to be a farther second distance from imaging device 100 based on measurements obtained from LiDAR sensor 103. In some such embodiments, the postprocessing may shift focus or the focal depth of the image to the foreground objects while making the background objects less noticeable.

In some embodiments, postprocessing an image based on the distance measurements obtained from LiDAR sensor 103 may be used to create an adjustable or enhanced bokeh effect. A bokeh effect is typically produced by using a shallow focus or depth-of-field to capture a scene so that objects in the scene background or outside the depth-of-field are blurred. LiDAR sensor 103 may provide exact distance measurements for objects in a captured scene so the bokeh effect may be modified and/or customized.

Creating a customized bokeh effect using the distance measurements from LiDAR sensor 103 may include retaining the visual detail for any object at a desired distance, and blurring all other objects at other distances. Accordingly, the distance measurements from LiDAR sensor 103 may be used to blur objects in the foreground and the background while retaining visual detail of objects in the midground, or may be used to blur objects in the midground while retaining visual detail of object in the foreground and background. A traditional bokeh effect that is based on the depth-of-field cannot generate these results.

An extension of the customized bokeh effect may be to select and retain the visual detail of a first object at a particular distance and blur the visual detail of a second object at the same particular distance. For instance, postprocessing system 600 may receive a selection of one or more pixels that represent the first object, may identify the first set of pixels surrounding the selected one or more pixels that are associated with similar depth or distance measurements, may detect pixels that separate the first set of pixels from a second set of pixels representing the second object and that are not associated with the similar depth or distance measurements, and may retain the visual detail of only the first set of neighboring pixels with the similar depth or distance measurements and blur other pixels including the second set of pixels representing the second object at the same depth or distance as the first object.

In some embodiments, the distance measurements from LiDAR sensor 103 may be used to specifically control the distance at which the bokeh effect is applied. For instance, the distance measurements may be used to retain visual detail of a person and a sign that is particular distance away from the person while blurring all other objects that not in the range of distance between the person and the sign.

In some embodiments, the distance measurements from LiDAR sensor 103 may be used to create customized bokeh effects at different distances. For instance, a traditional bokeh effect that is created for objects outside the depth-of-field does not provide the user control over how much to blur the objects outside the depth-of-field. However, with the distance measurements from LiDAR sensor 103, a user may configure the postprocessing to blur the pixels of objects that are within a first range of distances by a first amount, and to blur the pixels of objects that are within a different second range of distances by a second amount. Consequently, the pixels of objects that are closer to imaging device 100 may be blurred more or less than the pixels of objects that are farther from imaging device 100.

Figure 7:
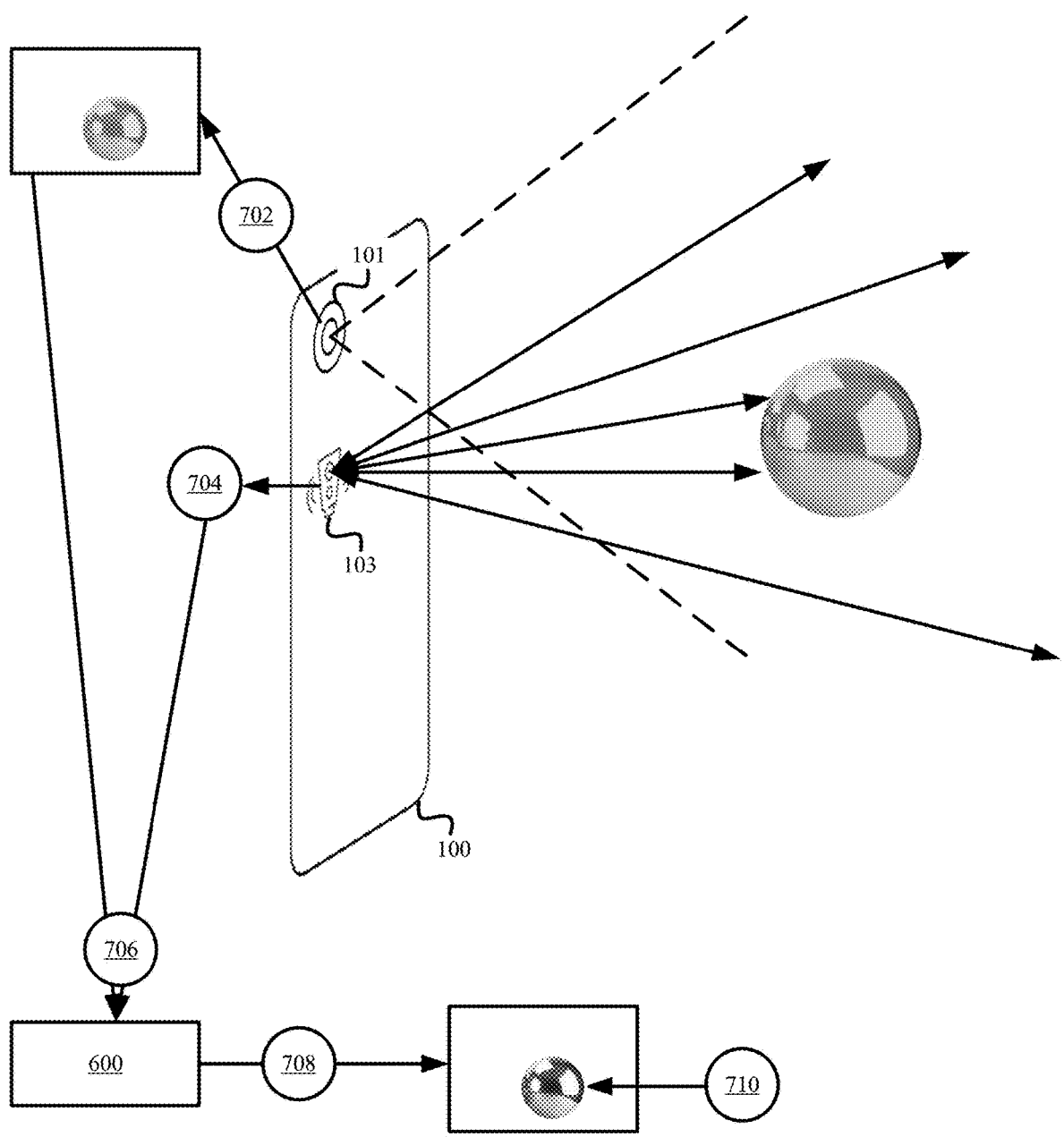
FIG. 7 illustrates an example of postprocessing an image based on material properties of objects in a scene detected using the LiDAR sensor in accordance with some embodiments presented herein.

FIG. 7 illustrates an example of postprocessing an image based on material properties of objects in a scene detected using LiDAR sensor 103 in accordance with some embodiments presented herein. Imaging device 100 may capture (at 702) an image of an object in a scene based on output of imaging sensor 101, and may obtain (at 704) material properties of the object based on outputs of LiDAR sensor 103. Specifically, the incident angle, laser return strength, and/or other measurements from LiDAR sensor 103 may be processed to derive measurements of reflectivity, wetness, roughness, translucence, and/or other material properties of the object.

Imaging device 100 may provide (at 706) the image data along with LiDAR sensor 103 measurements for postprocessing (e.g., to processor 105 of imaging device that performs the postprocessing or postprocessing system 600). The postprocessing may include analyzing (at 708) the amount of light that was measured at different parts of the scene by imaging sensor 101 and/or a light meter relative to the one or more material properties detected for the object at the corresponding parts of the scene, and applying (at 710) different adjustments to the pixels that represent the object in the image based on how light reacts to the one or more material properties detected for that object.

In some embodiments, the postprocessing may use one or more mathematical formulas that define the reactivity of different material properties to different amounts of light in order to compute the postprocessing adjustments to make to the captured image. For instance, a matte material property may reflect a first amount of light that is less than a second amount of light reflected by a reflective material property. Similarly, a wet and/or jagged surface may reflect a third amount of light that is less than a fourth amount of light reflected by a dry and/or smooth surface. Accordingly, the postprocessing may include boosting (at 710) and/or increasing the color values, saturation, levels, contrast, brightness, and/or visual characteristics for the parts of the image that correspond to parts of the imaged object with a detected reflective, smooth, or dry material property, and/or decreasing the color values, saturation, levels, brightness, and/or visual characteristics for the parts of the image that correspond to parts of the imaged object with a detected matte, rough, or wet material property. In this manner, the postprocessing may dynamically boost the highlights for an image containing a reflective object, and may dynamically boost the lowlights for an image containing a matte object. The adjustment amount to the visual characteristics may vary based on a value associated with the material properties.

In some embodiments, LiDAR sensor 103 may quantify the reflectivity of a surface by a numerical value rather than binary values of "reflective" or "matte". For instance, a value of 0 may represent a completely opaque surface, a value of 10 may represent a fully reflective mirrored surface, and values between 1-9 may represent different reflectivity amounts between an opaque and fully reflective mirrored surface. An object with a reflectivity value of 10 may receive a first increase to the highlights and/or brightness, an object with a reflectivity value of 6 may receive a second increase to the highlights and/or brightness, and an object with a reflectivity value of 3 may receive a third increase to the lowlights, wherein the first increase may be greater in magnitude than the second increase.

Accordingly, the material properties may be used during postprocessing to improve the accuracy and quality of objects in an image, and to improve the photorealism of an image that may be limited by the capture capabilities of imaging sensors 101 and/or restrictions imposed on imaging sensors 101 by a configured set of exposure settings. For instance, an object may be imaged using an optimal set of exposure settings that prevent overexposing highly reflective areas and underexposing opaque or matte areas. The postprocessing may apply the overexposure effect to the highly reflective areas so as to increase the shininess of those areas, and the underexposure effect to the opaque or matte areas so as to decrease the shininess of those areas.

Figure 8:
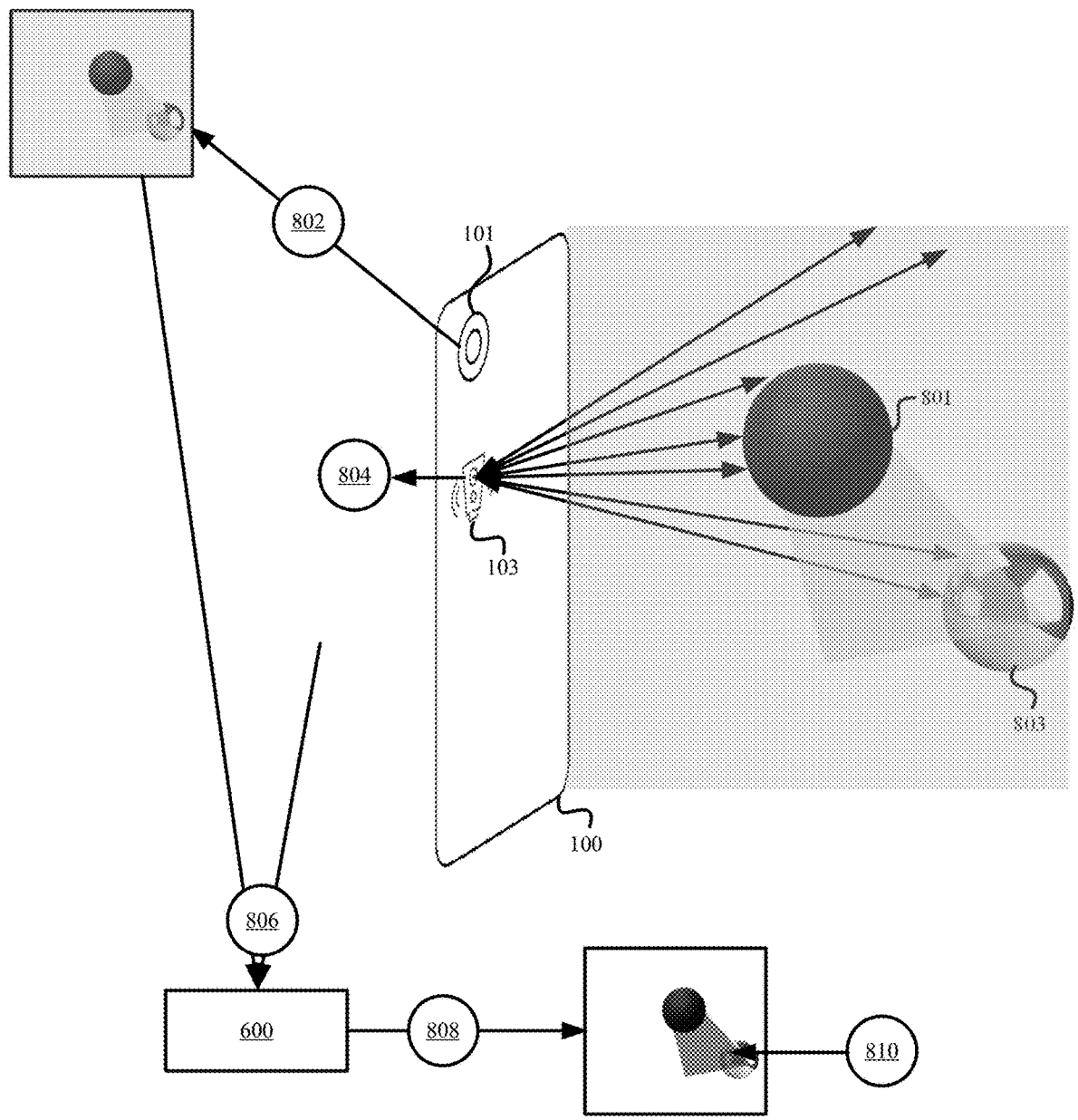
FIG. 8 illustrates an example of postprocessing an image to differentiate between shadows and lighting based on outputs of the LiDAR sensor in accordance with some embodiments presented herein.

In some embodiments, the postprocessing based on the outputs of LiDAR sensor 103 may improve image quality by differentiating between shadows and poor lighting, and performing different dynamic adjustments to objects in a shadow versus objects receiving poor lighting. FIG. 8 illustrates an example of postprocessing an image to differentiate between shadows and lighting based on outputs of LiDAR sensor 103 in accordance with some embodiments presented herein.

As shown in FIG. 8, imaging device 100 may capture (at 802) an image of a scene with first object 801 that casts a shadow over second object 803. The scene may be poorly lit so that both objects 801 and 803 appear dark in an unedited image.

LiDAR sensor 103 may determine (at 804) material properties of each object 801 and 803 based on ToF, incident angle, return strength, and/or other measurements of LiDAR sensor 103. For instance, LiDAR sensor 103 may detect that second object 803 has the same reflective surface across its entire surface.

Imaging device 100 may provide (at 806) the image data and the material properties for each object 801 and 803 represented by different sets of pixels in the image to postprocessing system 600. Postprocessing system 600 may evaluate the visual characteristics obtained for second object 803 in the received image with the outputs of LiDAR sensor 103 to determine (at 808) that second object 803 is in a shadow of another object (e.g., first object 801). Specifically, postprocessing system 600 may identify that second object 803 is imaged with more reflectivity in some parts than other parts even though second object 803 is determined to have the same reflective material property across its entire surface based on the outputs from LiDAR sensor 103.

To improve the image quality and correct for the poor lighting conditions of the scene, postprocessing system 600 may perform (at 810) a dynamic adjustment that increases the visual characteristics of the entire first object 801 and the parts of second object 803 that are determined to not be in the shadow. In other words, the postprocessing effect by postprocessing system 600 may artificially boost (at 810) the lighting for the parts of imaged objects 801 and 803 that are determined to not be in an area of a shadow, and may retain (at 810) the darkness for the parts of imaged objects 801 and 803 that are determined to be in the area of a shadow. Accordingly, the postprocessing may produce a realistic effect that allows the out-of-shadow regions to be enhanced and the in-shadow regions to be left unchanged so as to not appear overly bright in a shadow.

Figure 9:
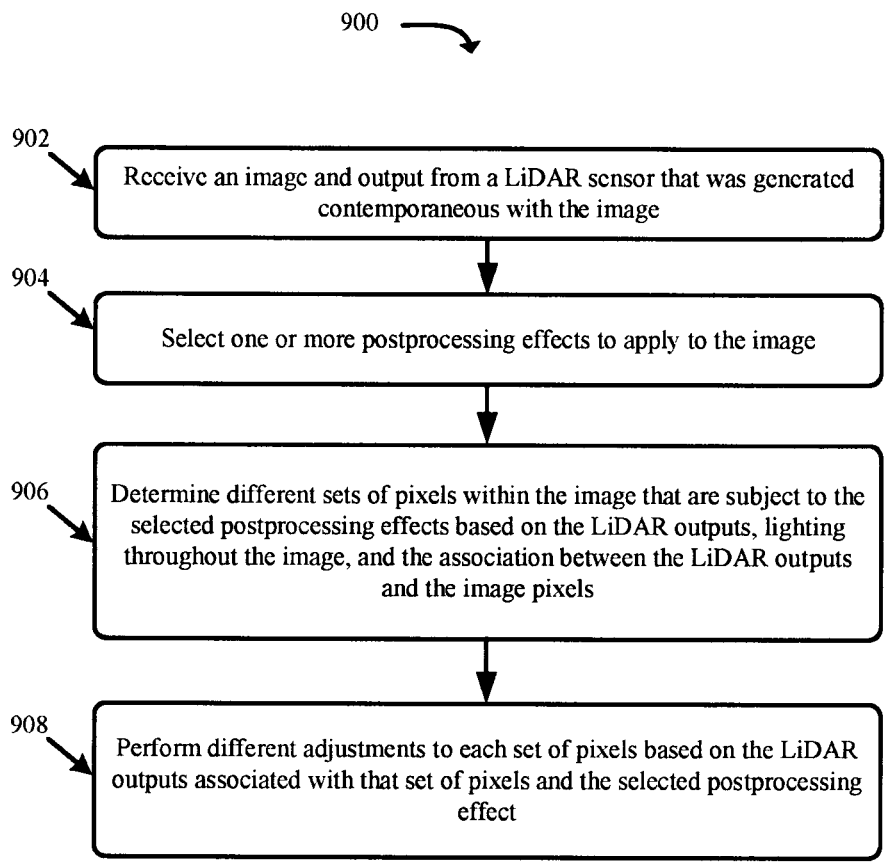
FIG. 9 presents a process for LiDAR-based image postprocessing in accordance with some embodiments presented herein.

FIG. 9 presents a process 900 for LiDAR-based image postprocessing in accordance with some embodiments presented herein. In some embodiments, process 900 may be implemented by one or more processors (e.g., processor 105) of imaging device 100 that perform the LiDAR-based image postprocessing as images are captured by imaging sensors 101 and/or in response to postprocessing effects configured on imaging device 100. In some other embodiments, process 900 may be implemented by one or more processors of postprocessing system 600. Postprocessing system 600 may include a machine or device that is separate from imaging device 100, and that is used to edit and/or postprocess images taken by different imaging devices 100.

Process 900 may include receiving (at 902) an image from imaging device 100 and output from LiDAR sensor 103 of imaging device 100 that was generated contemporaneous with the image. In some embodiments, the LiDAR output may be generated by LiDAR sensor 103 immediately before, during, or immediately after the image is taken using imaging sensors 101 of imaging device 100. In some embodiments, the LiDAR output may include raw data such as ToF, intensity values for the laser return strength, incident angle, and/or other properties for the lasers that were emitted and received by LiDAR sensor 103. In some embodiments, the LiDAR output may include derived values such as the distance, size, and/or position of a detected object and/or the material properties of the detected object (e.g., reflectivity, roughness, wetness, translucence, etc.). The derived values may be computed from the raw data by LiDAR sensor 103 and/or by one or processors of imaging device 100 or postprocessing system 600. In some embodiments, the LiDAR output may be associated with different pixels of the image. For instance, the distance and material properties of an object may be linked to the set of pixels that represent that object in the image and/or that are located in a region that corresponds to the region of the object in the imaged scene.

Process 900 may include selecting (at 904) one or more postprocessing effects to apply to the image. In some embodiments, the postprocessing effects may include different image enhancements that are based on object distances, sizes, positions, material properties, and/or other output of LiDAR sensor 103. In some embodiments, the postprocessing effects may include different image enhancements for improving the color values, contrast, brightness, levels, detail, and/or aspects of the image. The postprocessing effects may be selected (at 904) by a user or may be automatically selected (at 904) based on an evaluation of the image for inconsistencies, regions that do not satisfy one or more image quality thresholds or criteria, and/or regions that do not satisfy other conditions specified for a high-quality image.

Process 900 may include dynamically determining (at 906) different sets of pixels within the image that are subject to the selected (at 904) postprocessing effects based on the LiDAR outputs, lighting throughout the image, and the association between the LiDAR outputs and the image pixels. Specifically, process 900 may compare the LiDAR outputs and lighting at different parts of the image to color values and/or other visual characteristics of the pixels at the corresponding parts to identify different parts of the image that contain the inconsistencies and/or that do not satisfy one or more image quality thresholds, criteria, and/or other conditions associated with the selected (at 904) postprocessing effects.

Process 900 may include performing (at 908) different adjustments to each set of pixels based on the LiDAR outputs associated with that set of pixels and the selected (at 904) postprocessing effect. For instance, if the postprocessing effect involves boosting the image highlights, the postprocessing system may scan the LiDAR outputs for a first set of pixels that represent objects with highly reflective material properties, a second set of pixels that represent objects with lesser reflective material properties, and a third set of pixels that represent objects with little or no reflectivity. The postprocessing system may adjust the highlight, brightness, color values, and/or other visual characteristics of the first set of pixels by a first amount, the highlights, brightness, color values, and/or other visual characteristics of the second set of pixels by a second amount, and the highlights, brightness, color values, and/or other visual characteristics of the third set of pixels by a third amount. The first amount may be greater than the second amount, and the second amount may be greater than the third amount.

Figure 10:
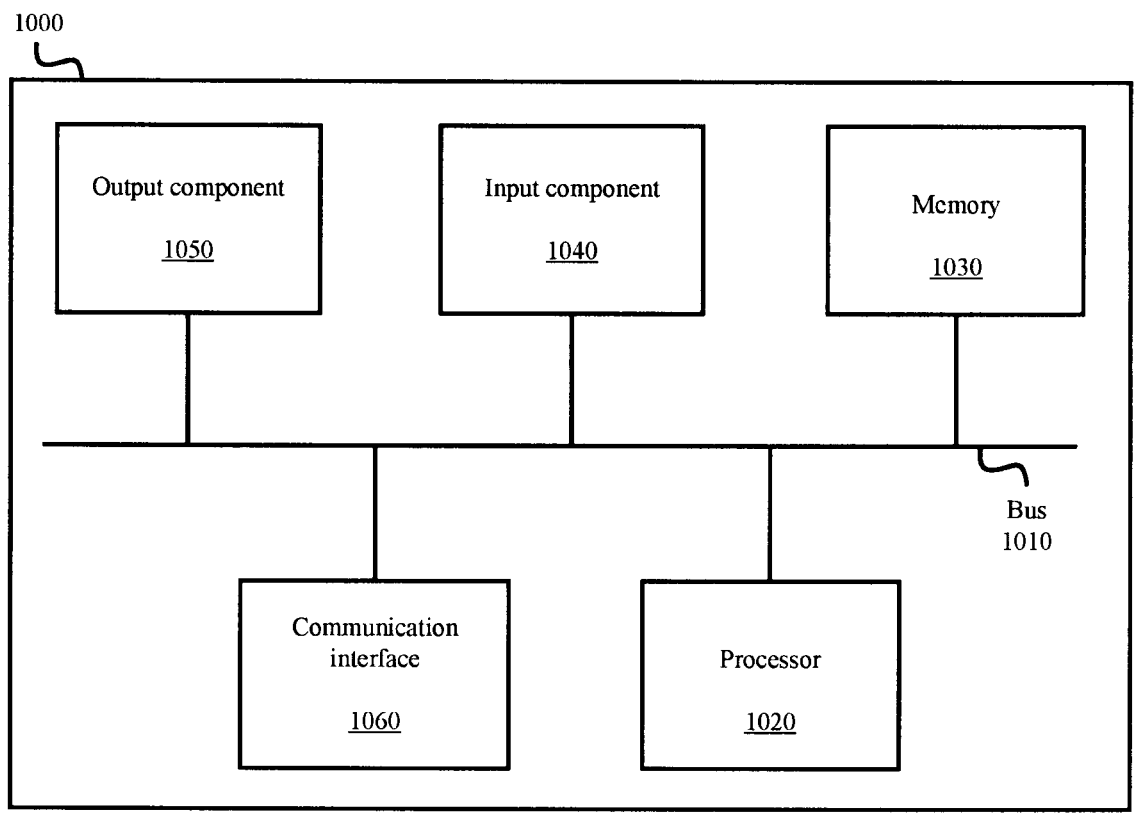
FIG. 10 illustrates example components of one or more devices, according to one or more embodiments described herein.

FIG. 10 is a diagram of example components of device 1000. Device 1000 may be used to implement one or more of the devices or systems described above (e.g., imaging device 100, postprocessing system 600, etc.). Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more LEDs, etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
receiving at least a first image and a second image of a same scene, wherein the first image is taken with first exposure settings and the second image is taken with second exposure settings;
determining that the first exposure settings are dynamically configured for imaging objects with a first material property at a first distance measurement and that the second exposure settings are dynamically configured for imaging objects with a second material property at a second distance measurement;
extracting a first set of pixels from a plurality of pixels of the first image in response to the first set of pixels being associated with the first material property and the first distance measurement in the first image that are determined to be optimally imaged with the first exposure settings;
extracting a second set of pixels from a plurality of pixels of the second image in response to the second set of pixels being associated with the second material property and the second distance measurement in the second image that are determined to be optimally imaged with the second exposure settings, wherein the first set of pixels correspond to a first region of the same scene and the second set of pixels correspond to a different second region of the same scene;
generating a composite image of the same scene by combining the first set of pixels with the second set of pixels; and
postprocessing the composite image by performing a different first set of adjustments to pixels of the composite image based on different distance measurements and by performing a second set of adjustments to pixels of the composite image based on different material properties,
wherein performing the first set of adjustments comprises:
changing visibility of the first set of pixels in the composite image without blurring or changing sharpness of the first set of pixels by performing a first adjustment to color values of each pixel from the first set of pixels based on the first distance measurement that is associated with the first set of pixels; and
changing visibility of the second set of pixels in the composite image without blurring or changing sharpness of the second set of pixels by performing a second adjustment to color values of each pixel from the second set of pixels based on the second distance measurement that is associated with the second set of pixels; and
wherein performing the second set of adjustments comprises:
performing a third adjustment to the color values of the first set of pixels based on the first material property that is associated with the first set of pixels; and
performing a fourth adjustment to the color values of the second set of pixels based on the second material property that is associated with the second set of pixels.

2. The method of claim 1 further comprising:
generating a bokeh effect in the composite image around different objects or regions represented by the first set of pixels associated with the first distance measurement by blurring objects or regions represented by the second set of pixels that are behind the objects or the regions represented by the first set of pixels by a first amount, and by blurring objects or regions represented by a third set of pixels that are in front of the objects or the regions represented by the first set of pixels by a second amount.

3. The method of claim 1,
wherein receiving the first image and the second image comprises receiving a first output from a first sensor of a particular device that captures the first image and the second image of the scene at different exposure settings and receiving a second output from a second sensor of the particular device that measures the first distance and the second distance.

4. The method of claim 3,
wherein the first sensor is a camera; and
wherein the second sensor is a Light Detection and Ranging ("LiDAR") sensor.

5. The method of claim 1 further comprising:
receiving positional data for each distance measurement associated with the first image and with the second image; and
mapping the first distance measurement to the first set of pixels based on the positional data associated with the first distance measurement corresponding to objects or regions in the first image represented by the first set of pixels.

6. The method of claim 1,
wherein changing the visibility of the first set of pixels comprises adjusting brightness, saturation, or contrast of the first set of pixels by a first amount in response to the first distance measurement corresponding to a first distance in the same scene; and
wherein changing the visibility of the second set of pixels comprises adjusting brightness, saturation, or contrast of the second set of pixels by a second amount in response to the second distance measurement corresponding to a second distance in the same scene that differs from the first distance.

7. The method of claim 1 further comprising:
generating a postprocessed image in response to performing the first set of adjustments and the second set of adjustments to the pixels of the composite image.

8. The method of claim 1 further comprising:
determining a size of a particular object based on the first distance measurement associated with the first set of pixels and a number of pixels in the first set of pixels that form the particular object; and
wherein performing the first set of adjustments further comprises:
performing a fifth adjustment to the first set of pixels in response to determining that the particular object has a first size based on the first distance measurement corresponding to a first distance and a first number of pixels in the first set of pixels forming the particular object; and
performing a sixth adjustment to the first set of pixels in response to determining that the particular object has a second size based on the first distance measurement corresponding to a second distance and a second number of pixels in the first set of pixels forming the particular object.

9. The method of claim 1 further comprising:
generating a customized bokeh effect by blurring pixels of the composite image that are associated with distance measurements that differ from the first distance measurement selected in response to the user selection.

10. The method of claim 1 further comprising:
generating a customized bokeh effect that originates from the first distance measurement, wherein generating the customized bokeh effect comprises determining a first amount with which to blur the second set of pixels based on a difference between the first distance measurement and the second distance measurement associated with the second set of pixels, and determining a second amount with which to blur a third set of pixels based on a difference between the first distance measurement and a third distance measurement associated with the third set of pixels.

11. The method of claim 1, wherein performing the different first second adjustment comprises:
adjusting the color values of the second set of pixels by an amount derived based on a difference between the second distance measurement and the first distance measurement.

12. The method of claim 1 further comprising:
determining the first and second material properties by:
measuring different amounts of light reflecting off different objects represented by the first set of pixels and the second set of pixels;
measuring an incident angle or return strength associated with each object of the different objects; and
deriving the first and second material properties based on the different amounts of light and the incident angle or the return strength associated with each object of the different objects.

13. The method of claim 1 further comprising:
determining that the first set of pixels comprises a first subset of pixels representing a first object and a second subset of pixels representing a second object at a common distance associated with the first distance measurement;
determining a user selection of one or more pixels that are part of the second subset of pixels; and
blurring the first subset of pixels associated with the first distance measurement without blurring the second subset of pixels associated with the first distance measurement in response to determining that the user selection of the one or more pixels is part of the second subset of pixels.

14. The method of claim 1, wherein the second adjustment increases the color values of the second set of pixels in response to the first adjustment decreasing the color values of the first set of pixels, and wherein the second adjustment decreases the color values of the second set of pixels in response to the first adjustment increasing the colors values of the first set of pixels.

15. An image postprocessing system comprising:
one or more processors configured to:
receive at least a first image and a second image of a same scene, wherein the first image is taken with first exposure settings and the second image is taken with second exposure settings;
determine that the first exposure settings are dynamically configured for imaging objects with a first material property at a first distance measurement and that the second exposure settings are dynamically configured for imaging objects with a second material property at a second distance measurement;
extract a first set of pixels from a plurality of pixels of the first image in response to the first set of pixels being associated with the first material property and the first distance measurement in the first image that are determined to be optimally imaged with the first exposure settings;
extract a second set of pixels from a plurality of pixels of the second image in response to the second set of pixels being associated with the second material property and the second distance measurement in the second image that are determined to be optimally imaged with the second exposure settings, wherein the first set of pixels correspond to a first region of the same scene and the second set of pixels correspond to a different second region of the same scene;
generate a composite image of the same scene by combining the first set of pixels with the second set of pixels; and
postprocess the composite image by performing a first set of adjustments to pixels of the composite image based on different distance measurements and by performing a second set of adjustments to pixels of the composite image based on different material properties,
wherein performing the first set of adjustments comprises:
changing visibility of the first set of pixels in the composite image without blurring or changing sharpness of the first set of pixels by performing a first adjustment to color values of each pixel from the first set of pixels based on the first distance measurement that is associated with the first set of pixels; and
changing visibility of the second set of pixels in the composite image without blurring or changing sharpness of the second set of pixels by performing a second adjustment to color values of each pixel from the second set of pixels based on the second distance measurement that is associated with the second set of pixels; and
wherein performing the second set of adjustments comprises:
performing a third adjustment to the color values of the first set of pixels based on the first material property that is associated with the first set of pixels; and
performing a fourth adjustment to the color values of the second set of pixels based on the second material property that is associated with the second set of pixels.

16. The image postprocessing system of claim 3 further comprising:
a first sensor that generates the first image and the second image; and
a second sensor that produces the first and second distance measurements.

17. The image postprocessing system of claim 15, wherein the one or more processors are further configured to:
receive positional data for each distance measurement associated with the first image and with the second image; and
mapping the first distance measurement to the first set of pixels based on the positional data associated with the first distance measurement corresponding to objects or regions in the first image represented by the first set of pixels.

18. The image postprocessing system of claim 15,
wherein changing the visibility of the first set of pixels comprises adjusting brightness, saturation, or contrast of the first set of pixels by a first amount in response to the first distance measurement corresponding to a first distance in the same scene; and
wherein changing the visibility of the second set of pixels comprises adjusting brightness, saturation, or contrast of the second set of pixels by a second amount in response to the second distance measurement corresponding to a second distance in the same scene that differs from the first distance.

19. A non-transitory computer-readable medium storing program instructions that, when executed by one or more hardware processors of an image postprocessing system, cause the image postprocessing system to perform operations comprising:
receiving at least a first image and a second image of a same scene, wherein the first image is taken with first exposure settings and the second image is taken with second exposure settings;
determining that the first exposure settings are dynamically configured for imaging objects with a first material property at a first distance measurement and that the second exposure settings are dynamically configured for imaging objects with a second material property at a second distance measurement;
extracting a first set of pixels from a plurality of pixels of the first image in response to the first set of pixels being associated with the first material property and the first distance measurement in the first image that are determined to be optimally imaged with the first exposure settings;
extracting a second set of pixels from a plurality of pixels of the second image in response to the second set of pixels being associated with the second material property and the second distance measurement in the second image that are determined to be optimally imaged with the second exposure settings, wherein the first set of pixels correspond to a first region of the same scene and the second set of pixels correspond to a different second region of the same scene;
generating a composite image of the same scene by combining the first set of pixels with the second set of pixels; and
postprocessing the composite image by performing a first set of adjustments to pixels of the composite image based on different distance measurements and by performing a second set of adjustments to pixels of the composite image based on different material properties,
wherein performing the first set of adjustments comprises:
changing visibility of the first set of pixels in the composite image without blurring or changing sharpness of the first set of pixels by performing a first adjustment to color values of each pixel from the first set of pixels based on the first distance measurement that is associated with the first set of pixels; and
changing visibility of the second set of pixels in the composite image without blurring or changing sharpness of the second set of pixels by performing a second adjustment to color values of each pixel from the second set of pixels based on the second distance measurement that is associated with the second set of pixels; and
wherein performing the second set of adjustments comprises:
performing a third adjustment to the color values of the first set of pixels based on the first material property that is associated with the first set of pixels; and
performing a fourth adjustment to the color values of the second set of pixels based on the second material property that is associated with the second set of pixels.

* * * * *